United States Patent [19]
Makino et al.

[11] Patent Number: 5,826,431
[45] Date of Patent: Oct. 27, 1998

[54] GAS TURBINE MULTI-HOLE FILM COOLED COMBUSTOR LINER AND METHOD OF MANUFACTURE

[75] Inventors: Yoshinobu Makino, Yokohama; Kiyoshi Yamada, Akishima; Hiroshi Matsui, Soka; Yoshihiro Aburatani, Yokohama; Yamato Kaminaka, Yokohama; Hiroshi Kubo, Yokohama; Hiroaki Okamoto, Yokohama, all of Japan

[73] Assignee: Kabushiki Kaisha Toshiba, Kawasaki, Japan

[21] Appl. No.: 596,827

[22] Filed: Feb. 5, 1996

[30] Foreign Application Priority Data

Feb. 6, 1995 [JP] Japan ................................ 7-017572
Oct. 23, 1995 [JP] Japan ................................ 7-274312

[51] Int. Cl.$^6$ .................................................... F02G 3/00
[52] U.S. Cl. ................................ 60/757; 60/754; 60/758
[58] Field of Search .......................... 60/755, 757, 758, 60/752, 760

[56] References Cited

U.S. PATENT DOCUMENTS

| | | | |
|---|---|---|---|
| 3,845,620 | 11/1974 | Kenworthy | 60/757 |
| 4,259,842 | 4/1981 | Koshoffer et al. | 60/757 |
| 4,896,510 | 1/1990 | Foltz | 60/757 |
| 5,483,794 | 1/1996 | Nicoll et al. | 60/757 |

FOREIGN PATENT DOCUMENTS

| | | |
|---|---|---|
| 0486 133 A1 | 5/1992 | European Pat. Off. . |
| 0571 254 A1 | 11/1993 | European Pat. Off. . |
| 15328 | 1/1989 | Japan . |
| 321084 | 12/1989 | Japan . |
| 118548 | 5/1993 | Japan . |

OTHER PUBLICATIONS

Hubele N. F. et al., "Using Experimental Design To Assess the Capability Of a System," Journal of Quality Technology, vol. 26, No. 1, Jan. 1994.

European Search Report for EPO Application EP 96 101667, 1996.

*Primary Examiner*—Charles G. Freay
*Attorney, Agent, or Firm*—Finnegan, Henderson, Farabow, Garrett & Dunner, L.L.P

[57] ABSTRACT

Provided are a gas turbine multi-hole film-cooled combustor liner, which can be manufactured with improved accuracy in shape and position of cooling holes in a very short time, ensuring desirable buckling strength and satisfactory cooling performance. A planar flat member is curved to form a liner shell of a cylindrical shape, the cylindrical member is welded in the longitudinal direction thereof to form a cylindrical shell. Then a wavy configuration and a corrugated configuration are formed on the cylindrical shell by a hydro-bulging method, cooling holes are formed through the liner shell by laser drilling at or near wave crest portions of the wavy configuration of the liner shell, and inner rings are attached to the liner shell by resistance spot welding or vacuum brazing.

3 Claims, 10 Drawing Sheets

GAS TURBINE MULTI-HOLE FILM COOLED COMBUSTOR LINER AND METHOD OF MANUFACTURE

BACKGROUND OF THE INVENTION

1. Field of the Invention

The present invention relates to a multi-hole film cooled combustor liner for use in a gas turbine for a regular power generation system, and a method of manufacture.

2. Information of the Related Art

A gas turbine for a regular power generation system, for example, a heavy-duty-type gas turbine, generally comprises a combustors located between a compressor and a turbine. In the combustor of this type, compressed air is supplied from the compressor into the combustor, and fuel ejected from a fuel injection valve is mixed and burned with the compressed air. A resultant combustion gas is cause to flow into the turbine, and usually has an intensely high temperature such as 2,000° C. To prevent the intense heat of the hot gas from damaging the turbine, the temperature of the gas at the outlet of the combustor must be made lower to an acceptable level such as 1,300° C. Thus, a great deal of air is required to cool the hot gas during the gas turbine operation.

Figure 11:
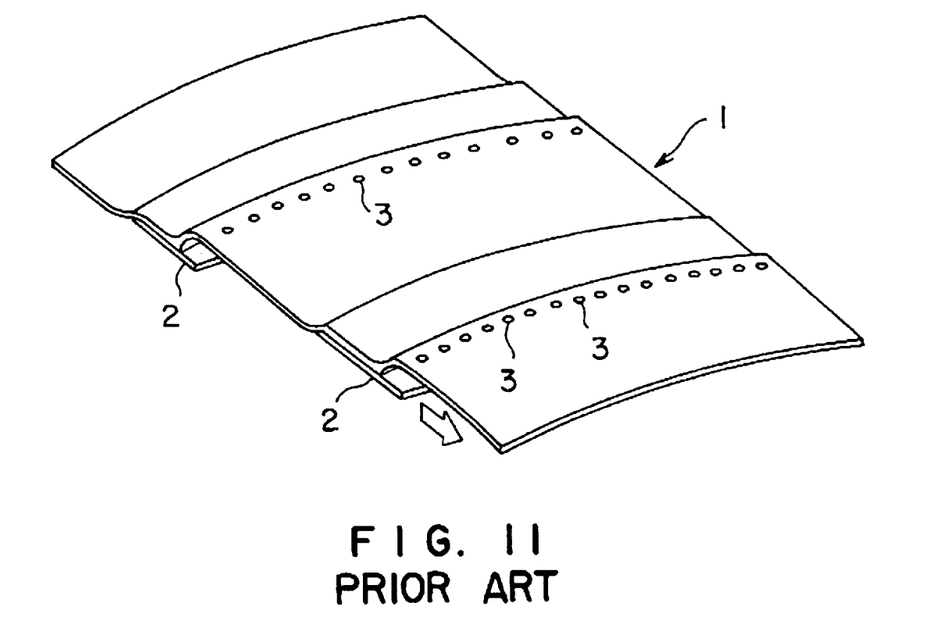
FIG. 11 is a perspective view of a conventional combustor liner.
Figure 12:
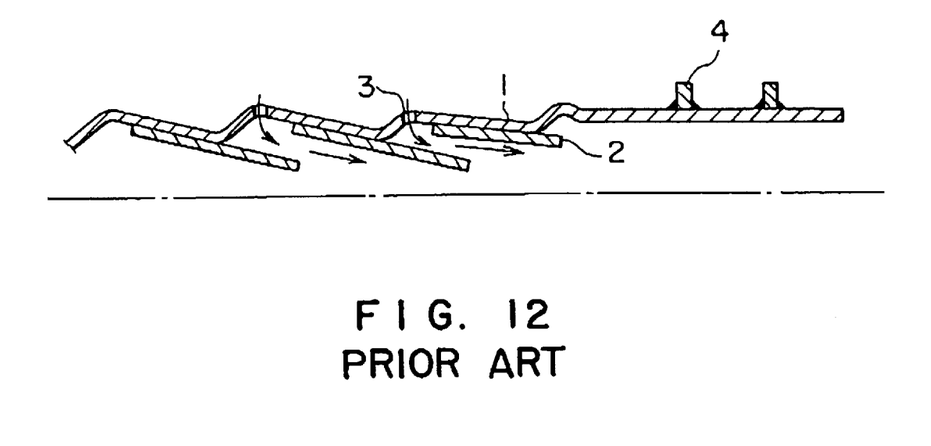
FIG. 12 is a sectional view of the conventional combustor liner.

Conventionally, as shown in FIG. 11 or 12, a film cooled combustor liner is provided in the combustor. A liner shell 1 is in the form of a wavy thin-walled cylinder, and inner rings 2 are attached to the inside of the shell 1. A large number of film cooling holes 3 are drilled through the wall of the liner shell 1. Air admitted through the cooling holes 3 is deflected by the inner rings 2 to flow along the inside of the liner in the flowing direction for the combustion gas. Thus, a cooling film is maintained along the inside of the liner, thereby efficiently cooling the gas passing through the liner to the turbine. As a result, the temperature of the combustion gas admitted into the turbine is lowered to the acceptable level. Further, fins 4 for improving the buckling strength of the combustor liner are attached by TIG welding or the like on the outer peripheral surface of the liner shell 1 on the downstream side.

As the liner shell 1 require strength at high-temperatures, an Ni- or Co-based alloy, a hardly workable material, is used as a base material for the liner shell 1. The liner shell 1 of this material is manufactured by a method shown in FIG. 13A or 13B.

Figure 13A:
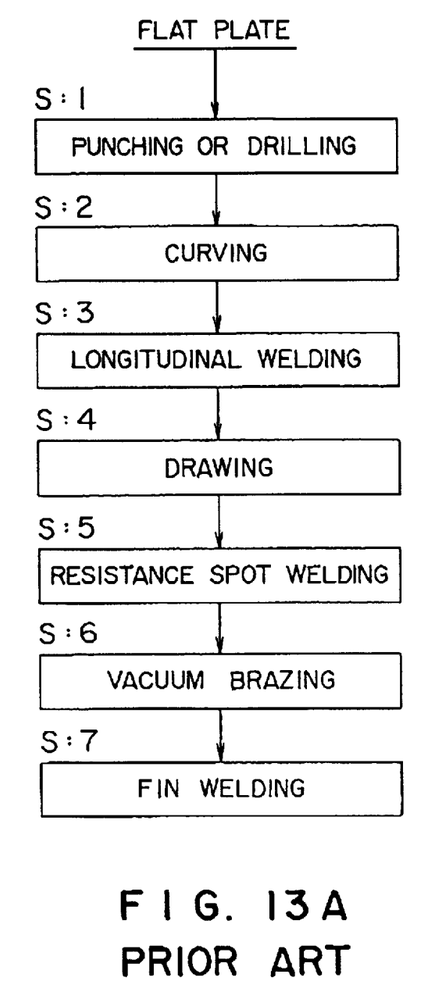
FIGS. 13A and 13B are flowcharts showing different conventional combustor liner manufacturing processes.
Figure 14:
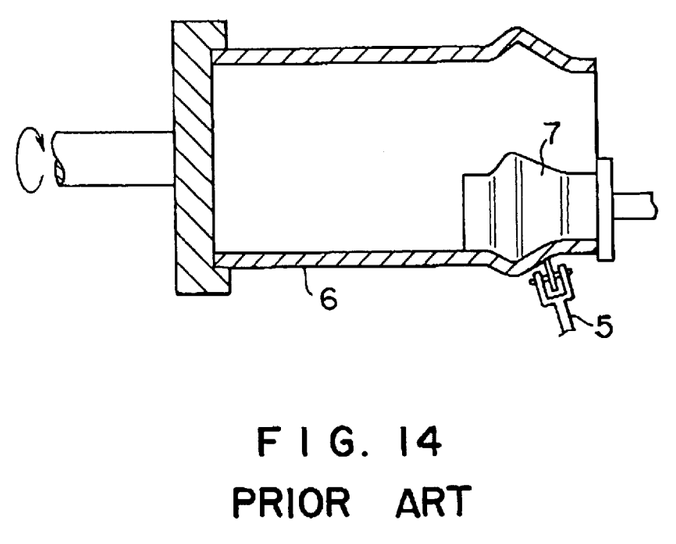
FIG. 14 is a sectional view of a conventional drawing apparatus.

According to the manufacturing method shown in FIG. 13A, the cooling holes 3 are drilled through a flat member or plate by punching or drilling in Step S1, the flat member is curved into a cylindrical shape in Step S2, and the cylindrical member is welded in the longitudinal direction by TIG welding or the like in Step S3. In Step S4, moreover, the welded cylindrical member is formed into a wavy shape by spinning. As is also shown in FIG. 14, the welded cylindrical member 6 is rotated as a roller 5 is externally pressed against a die 7 set inside the welded cylindrical member 6. Thus, the welded cylindrical member 6 is formed into a wavy shape. Then, in Steps S5 or S6, the inner rings 2 are bonded to the liner shell 1 by resistance spot welding or vacuum brazing. In Step S7, fins 4 are bonded to the liner shell 1 by TIG welding or the like.

Figure 13B:
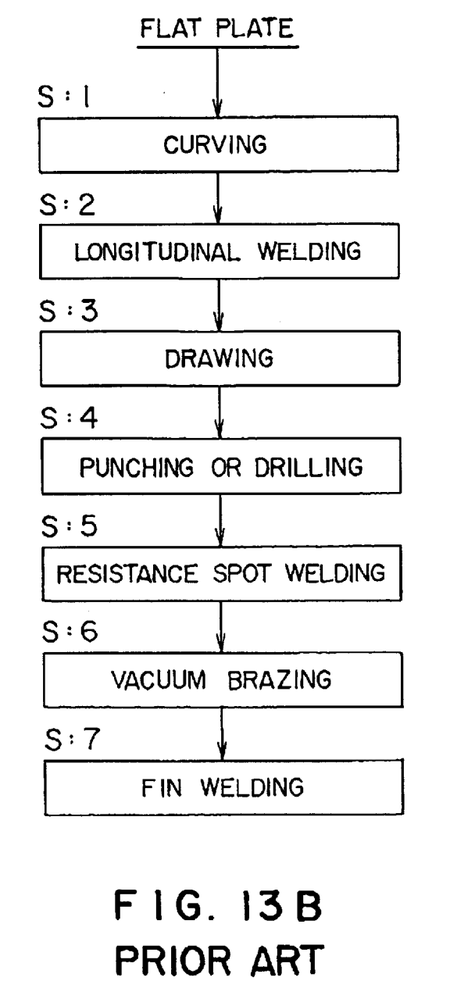

On the other hand, according the manufacturing method shown in FIG. 13B, a flat member or plate is curved into a cylindrical shape in Step S1, the cylindrical member is welded in the longitudinal direction by TIG welding or the like in Step S2, and the welded cylindrical member is formed into a wavy shape by spinning in Step S3 in the manner shown in FIG. 14. In Step S4, moreover, the cooling holes 3 are drilled through the wavy cylindrical member by punching or drilling. In Steps S5 or S6, the inner rings 2 are bonded to the liner shell 1 by resistance spot welding or vacuum brazing. In Step S7, fins 4 with a length of about 1 mm are bonded to the liner shell 1 by TIG welding or the like.

According the manufacturing method shown in FIG. 13A, however, the liner shell 1 is formed into the wavy shape after the cooling holes 3 are drilled therethrough, whereupon the configuration of the cooling holes 3 may possibly be deteriorated. In some cases, moreover, the cooling holes 3 fail to be arranged in appropriate position in the wavy wall of the liner shell 1.

According the manufacturing method shown in FIG. 13B, the punching process requires replacement of a used punch or other tool, and repairing the liner shell 1 takes much time when the punch is broken, even though the liner shell 1 is accurately formed into the wavy shape. In boring the cooling holes 3 by drilling, moreover, a predrilling process which is a requisite for the drilling operation takes more time than the punching process.

In the case where the inner rings 2 are attached to the liner shell 1, in either of the manufacturing methods shown in FIGS. 13A and 13B, they must be expanded, spot-welded, and brazed, wherefore it is very difficult to maintain the quality of brazed portions and attach the rings 2 in a short period of time.

Furthermore, since the reinforcement fins 4 bonded to the liner shell 1 by TIG welding are liable to substantial thermal deformation, furthermore, the liner results in having an unsatisfactory buckling strength.

SUMMARY OF THE INVENTION

The object of the present invention is to provide a film cooled combustor liner, manufactured with improved accuracy in shape and position of film cooling holes in a very short time, and ensuring desirable buckling strength and satisfactory cooling performance, and a method for manufacturing the same.

In an aspect of the present invention, there is provided a multi-hole film-cooled combustor liner for a gas turbine, said combustor liner being mounted on a combustor located between a compressor and the turbine, said combustor liner comprising, a wavy liner shell, mounted on said combustor, for undergoing heat from a combustion gas passing through said combustor, said liner shell having a plurality of film cooling holes for admitting air from an outside to an inside of said liner shell, and inner rings, attached to the inside of said liner shell, for deflecting the air admitted through said cooling holes so as to direct air toward a downstream direction for the combustion gas along the inner surface of the liner shell, thereby mainlining a cooling film, said cooling holes being formed through the liner shell by laser drilling in a manner such that the center axis of each cooling hole is inclined toward the downstream direction for the combustion gas.

Thus, according to the present invention, the respective central axes of the cooling holes are inclined toward the downstream direction for the combustion gas. Accordingly, air can be directed effectively toward and along the inner surface of the liner shell so as to maintain a satisfactory cooling film, and therefore, the cooling efficiency for the liner shell can be improved.

In another aspect of the invention, there is provided a multi-hole film-cooled combustor liner for a gas turbine, said combustor liner being mounted on a combustor located between a compressor and the turbine, said combustor liner comprising, a wavy liner shell, mounted on said combustor, for undergoing heat from a combustion gas passing through said combustor, said liner shell having a plurality of film cooling holes for admitting air from an outside to an inside of said liner shell so as to direct air toward a downstream direction for the combustion gas along the inner surface of the liner shell thereby providing film cooling, said cooling holes being formed by laser drilling through those regions situated in the upstream direction for the combustion gas from wave crest portions of the liner shell in a manner such that the center axis of each cooling hole is inclined toward the upstream direction for the combustion gas.

Since the inner rings are not used in this arrangement, the manufacturing processes are considerably reduced in number. Moreover, air is directed immediately toward and along the inner surface of the liner shell after it is admitted through the cooling holes, whereupon the cooling performance can be improved.

In still another aspect of the invention, there is provided a method for manufacturing a multi-hole film-cooled combustor liner for a gas turbine, said combustor liner being mounted on a combustor located between a compressor and the turbine, said method comprising steps of, curving a planar flat member to form a liner shell of a cylindrical shape, welding the cylindrical member in the longitudinal direction thereof to form a cylindrical shell, forming a wavy configuration and a corrugated configuration on the cylindrical shell by a hydro-bulging method, forming cooling holes through the liner shell by laser drilling at or near wave crest portions of the wavy configuration of the liner shell, and bonding inner rings to the liner shell by resistance spot welding and vacuum brazing.

Thus, the wavy configuration and the corrugated configuration are formed by the hydro-bulging method, whereupon they can be completed with high accuracy in a short time. Since the cooling holes are formed by laser drilling, moreover, the accuracy in position and shape of the cooling holes is greatly improved, whereupon the cooling efficiency for the liner shell can be increased.

In a further aspect of the invention, there is provided a method for manufacturing a multi-hole film cooled combustor liner for a gas turbine, said combustor liner being mounted on a combustor located between a compressor and the turbine, said method comprising steps of, curving a planar flat member to form a liner shell of a cylindrical shape, welding the cylindrical member in the longitudinal direction thereof to form a cylindrical shell, forming a wavy configuration and a corrugated configuration on the cylindrical shell by a hydro-bulging method, and, forming cooling holes by laser drilling through those regions situated upstream of wave crest portions of the liner shell in a manner such that the center axis of each cooling hole is inclined toward the upstream direction for the combustion gas.

Since the inner rings are not used in this arrangement, the manufacturing processes are considerably reduced in number. Since the wavy configuration and the like are formed by the hydro-bulging method, they can be completed with high accuracy in a short time- Since air is directed immediately toward and along the inner surface of the liner shell after it is admitted through the cooling holes which are formed by laser drilling, the accuracy in position and shape of the cooling holes is greatly improved, whereupon the cooling efficiency for the liner shell can be increased.

DETAILED DESCRIPTION OF THE PREFERRED EMBODIMENTS

Preferred embodiments of the present invention will be understood from the following detailed description made with reference to the accompanying drawings.

Figure 1:
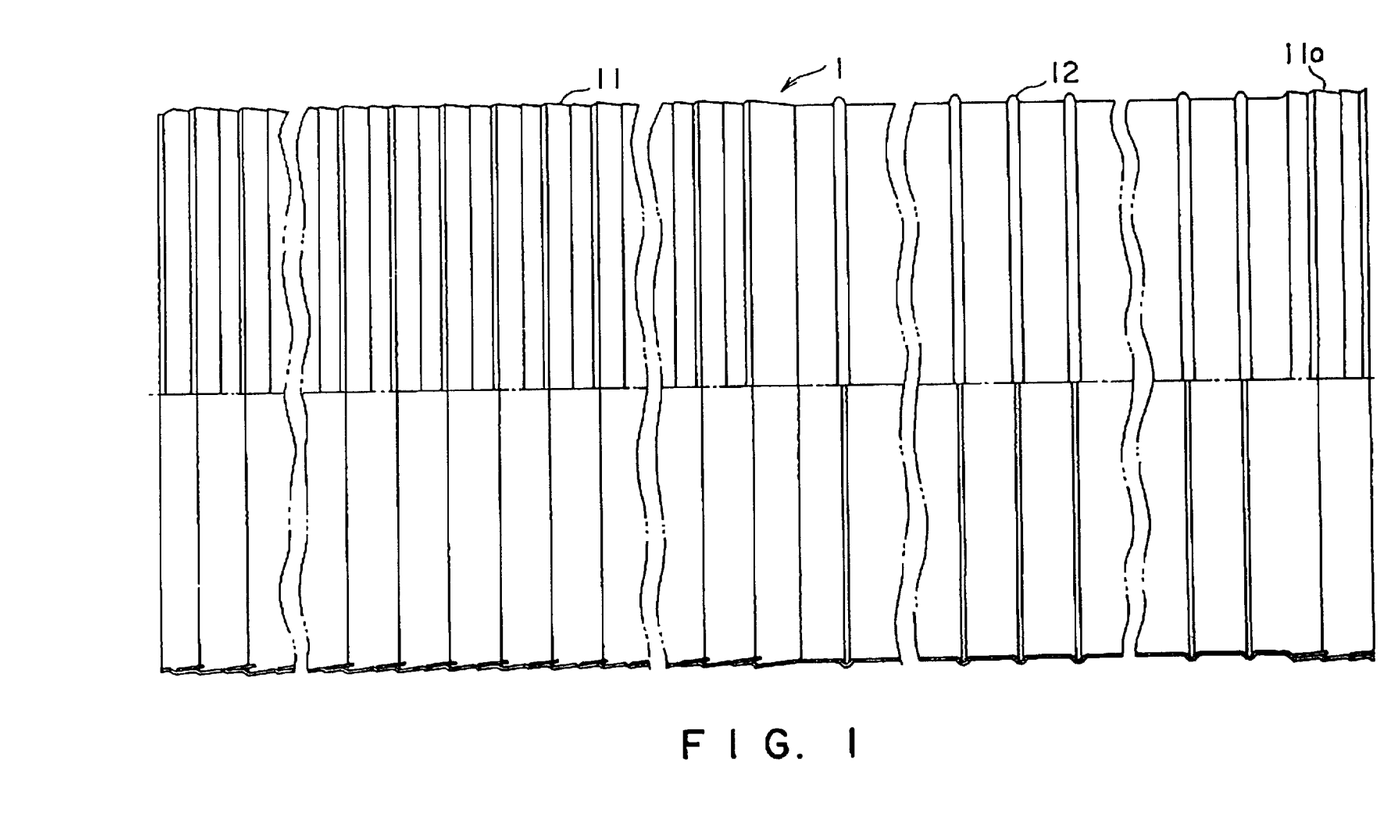
FIG. 1 is a side view of a combustor liner manufactured by a method according to a first embodiment of the present invention.

Referring now to FIGS. 1 to 8, a combustor liner according to a first embodiment of the present invention will be described in detail. FIG. 1 shows an outline of the combustor liner, whose shell 1 has a wavy configuration 11, a corrugated configuration 12 on the downstream side of the wavy configuration 11 with respect to the flowing direction for a fuel gas, and a wavy configuration 11a on the downstream side of the corrugated configuration 12. The liner shell 1 is formed by the hydro-bulging method.

Figure 2:
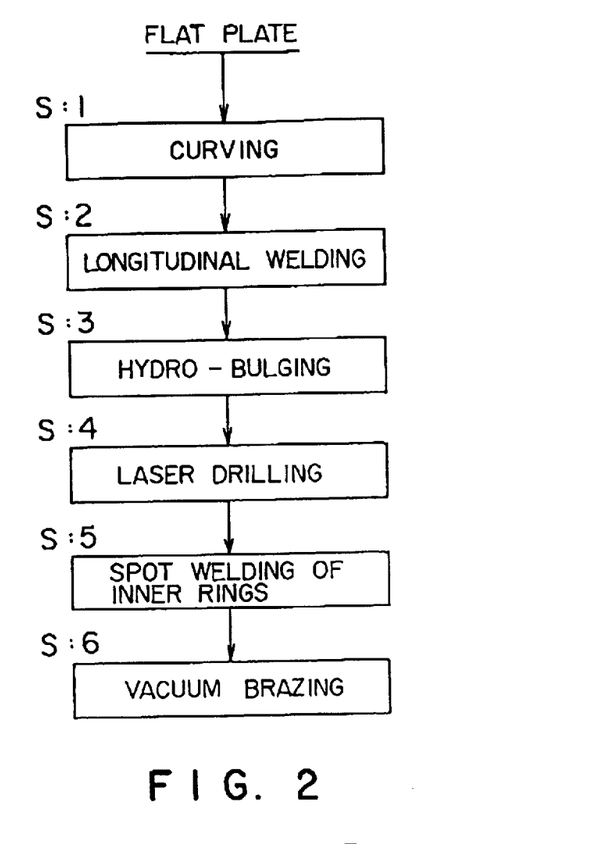
FIG. 2 is a flowchart showing a liner manufacturing process of the method according to the first embodiment.

Referring now to the flowchart of FIG. 2, processes for manufacturing the combustor liner according to the present embodiment will be described.

In the process of Step S1, a flat member or plate to form the liner shell 1 is curved or rolled into a cylindrical shape by means of, for example, three rollers. In this process, a cylinder having a diameter of 300 to 400 mm is obtained.

In the process of Step S2, the cylindrically rolled member is welded along the opposite longitudinal edge, whereupon a cylindrical shell is completed. The welding may, for example, be TIG welding, laser welding, or plasma welding.

Figure 3:
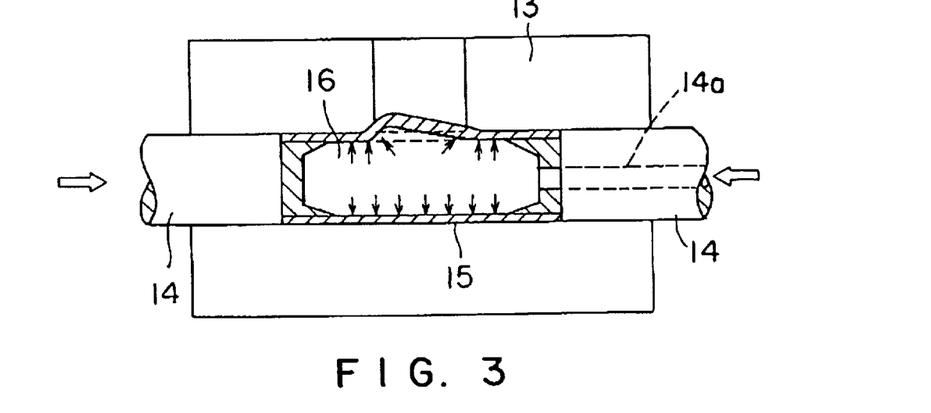
FIG. 3 is a sectional view of a hydro-bulging apparatus.

In the process of Step S3, the wavy configurations 11 and 11a and the corrugated configuration 12 are formed on the cylindrical shell by the hydro-bulging method. FIG. 3 shows a hydro-bulging apparatus. A cylindrical shell 15 is inserted in a split mold 13, and a pair of pistons 14 each having a liquid inlet 14a are fitted individually on the opposite sides of the cylindrical shell 15.

Figure 5:
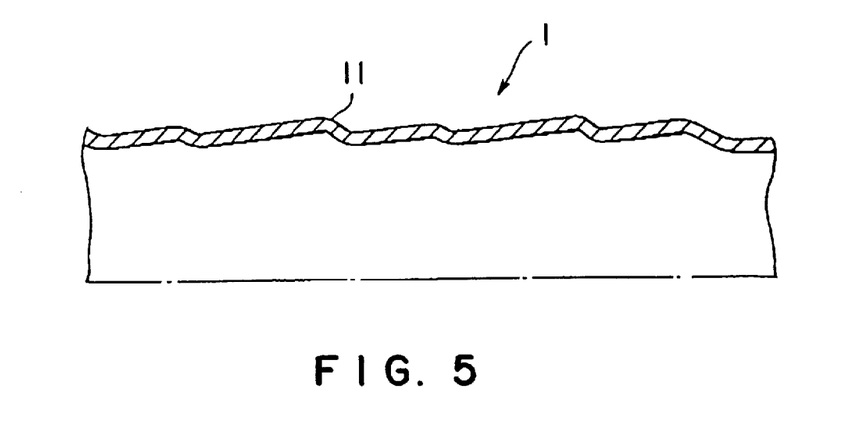
FIG. 5 is a sectional view of a wavy-configuration region of the liner manufactured by the method according to the first embodiment.
Figure 6:
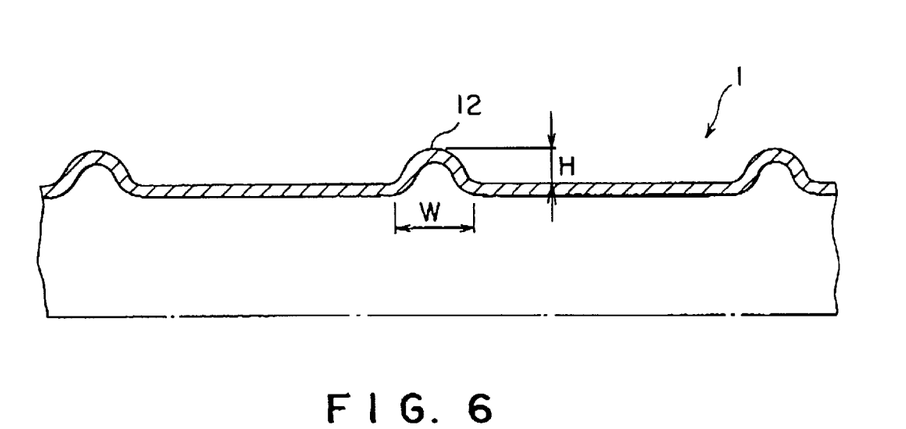
FIG. 6 is a sectional view of a corrugated-configuration region of the liner manufactured by the method according to the first embodiment.

In the manufacturing process, the cylindrical shell 15 is inserted into the split mold 13, and the mold 13 is set in position. Then, a liquid 16 is introduced into the cylindrical shell 15 through the liquid inlets 14a of the pistons 14, and the pistons 14 are pressed under a pressure of 1,000 to 2,000 atm. for 1 to 10 minutes. In this case, the liquid 16 may be water or oil. The wavy configurations 11 and 11a and the corrugated configuration 12 are formed in this manner, as shown in FIG. 1. FIGS. 5 and 6 show these sectional configurations. The wavy configurations 11 and 11a have pitches (P) of 10 to 20 mm and a radius (R) of curvature of 1 to 4 mm. The corrugated configuration 12 has a height (H) of 2 to 10 mm and a width (W) of 3 to 20 mm.

Figure 4A:
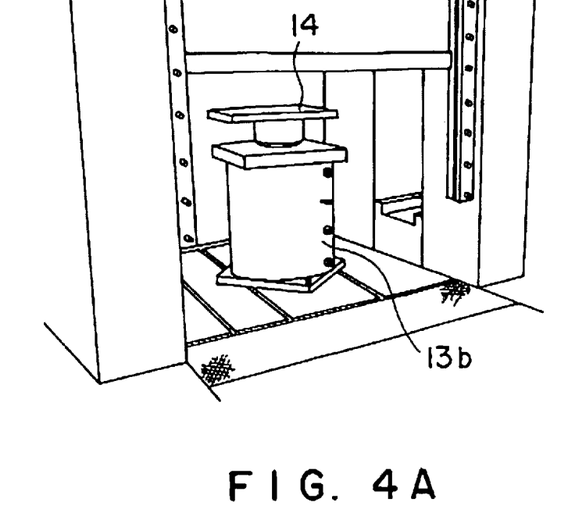
FIGS. 4A and 4B are perspective views showing a modification of the hydro-bulging apparatus.
Figure 4B:
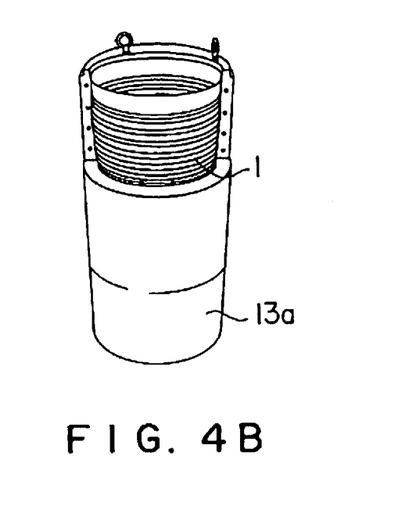

As shown in FIGS. 4A and 4B, a mold for hydrobulging has a dual structure, including an inner mold 13a and an outer mold 13b. The cylindrical member for forming the liner shell 1 is set in the inner mold 13a. The outer mold 13b may be arranged so as to cover the inner mold 13a.

Figure 7A:
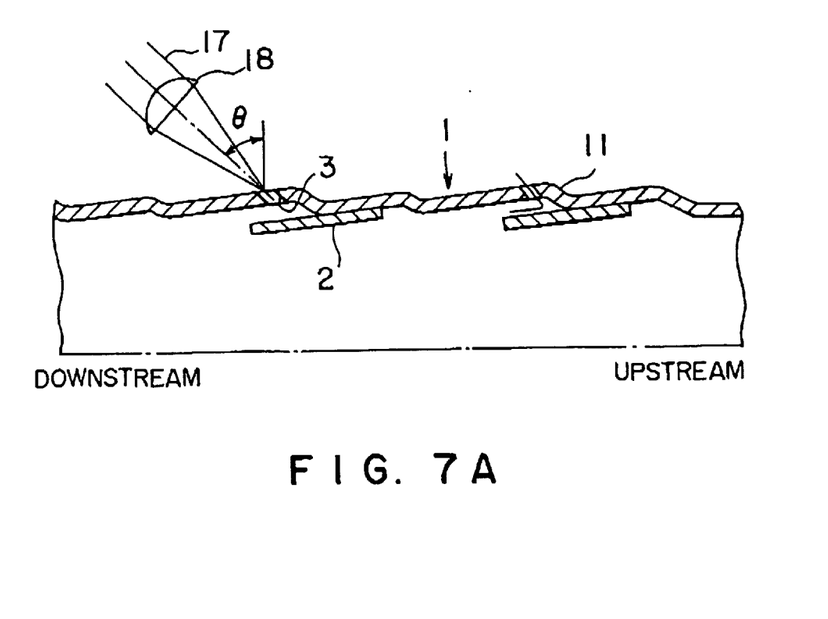
FIG. 7A is a sectional view for illustrating the way in which cooling holes are formed by laser drilling according to the first embodiment.
Figure 7B:
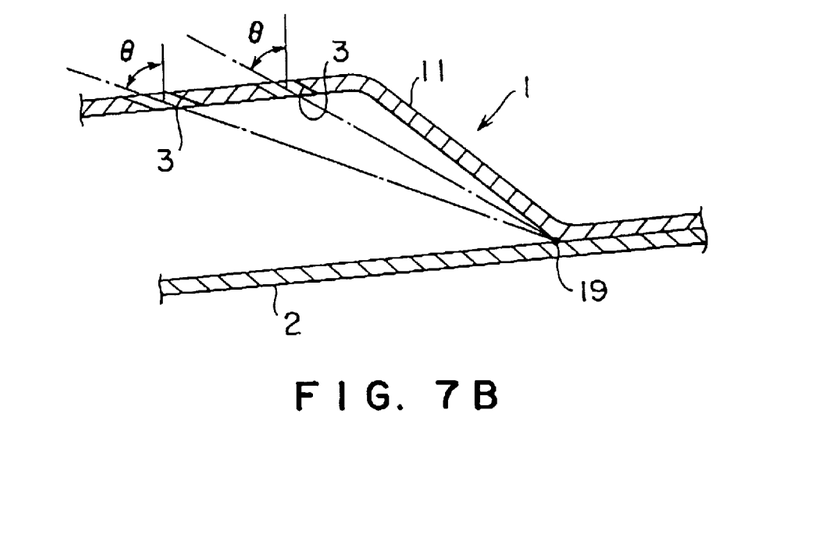
FIG. 7B is an enlarged view showing the principal part of the structure shown in FIG. 7A.

Then, in the process of Step S4, film cooling holes 3 (FIGS. 7A and 7B) are drilled through the liner shell 1, which has the wavy configuration 11 and the corrugated configuration 12, as shown in FIGS. 5 and 6, by laser processing or laser drilling. An industrial laser, such as a $CO_2$ laser, YAG laser, or excimer laser, is used to generate a laser beam 17 for laser drilling, as shown in FIGS. 7A and 7B. An optical system for focusing the laser beam 17 may be a focusing lens 18, as shown in FIG. 7A, or a focusing mirror. The laser drilling may be used for other drilling or cutting operations than the cooling hole drilling.

During the laser drilling, the laser beam 17 generated from a laser oscillator (not shown) is incident on a point of processing by means of, for example, the focusing lens 18, thereby drilling the liner shell 1. The laser drilling may be carried out either by a percussion method, in which the laser beam 17 is fixed in position, or a trepanning method, in which the laser beam is moved. The laser may be generated with pulse oscillation or continuous oscillation. Oxygen, nitrogen, or air may be used as a processing gas. The following is a description of specific processing conditions.

$CO_2$ laser output power: 500 to 5,000 W.

Processing speed: 10 to 2,000 mm/min.

Processing gas: Oxygen, nitrogen, air.

Supplied gas pressure: 0.5 to 15 $kgf/cm^2$.

Focal length of lens: 63.5, 95, 127, 190, 254 mm.

Focal position: −8 to +2 mm.

Base material: Ni-based alloy, Co-based alloy.

According to the present embodiment, each cooling hole 3 is formed by laser drilling in a manner such that its center axis is inclined toward downstream side at an angle θ to a radial direction for the liner shell 1, as shown in FIG. 7A. In this arrangement, air is directed toward and along the inner surface of the liner shell 1 so as to maintain a satisfactory cooling film, and therefore, the cooling efficiency for the liner shell 1 and inner rings 2 attached to the inner surface of the liner shell 1 can be improved.

Figure 8:
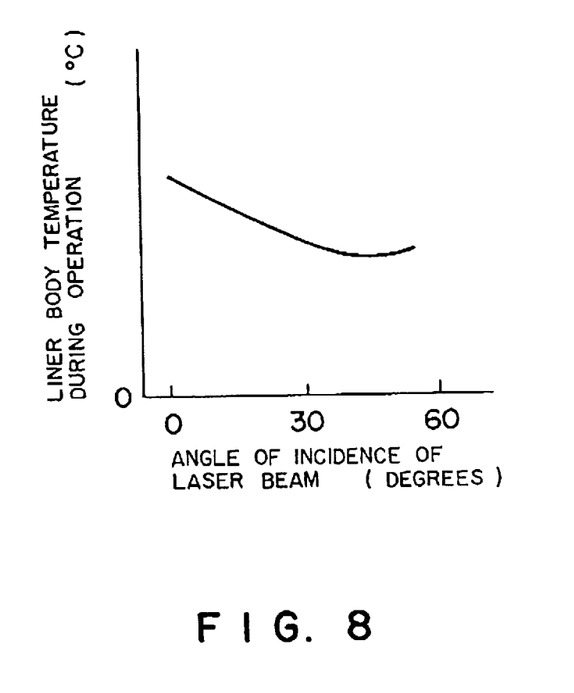
FIG. 8 is a graph showing the relationship between the angle of incidence of a laser beam and the liner shell temperature during operation.

FIG. 8 shows the relationship between the angle θ of inclination and the temperature of the liner shell 1. The lower limit value of the angle θ is 20°. If the angle θ exceeds 60°, the laser drilling is difficult. Preferably, therefore, the inclination angle θ ranges from 20° to 60°.

Preferably, moreover, the center axis of each cooling hole 3 should be inclined or angularly moved toward downstream side with respect to the radial direction for the liner shell 1 whereupon the air admitted through each hole 3 directs toward a junction 19 between the liner shell 1 and each inner ring 2. In this case, the cooling holes 3 are positioned such that the inclination angle 9 increases with distance from each wave crest portion of the wavy configuration. Thus, the cooling film is maintained more satisfactorily, whereby the cooling efficiency can be further improved.

In the succeeding Steps S5 and S6, the inner rings 2 are bonded to the liner shell I by resistance spot welding and vacuum brazing. In these steps, a resistance spot welder and a vacuum brazing apparatus are used.

The resistance spot welding of Step S5 is carried out under the following conditions.

Current value: 10,000 to 15,000 A.

Applied pressure: 3 to 10 $kgf/mm^2$.

Electrode shape: Round (5 to 10 mm in diameter).

Conduction time: 0.05 to 1 second.

The following is a description of conditions for the vacuum brazing of Step S6.

Brazing material: BNi-5.

Heat cycle: Heating-up at 5° C. /min → 30 minutes at 850° to 900° C. → 5 minutes at 1,050° to 1,200° C.→ furnace cooling (cooling gas is supplied at more than 800° C.).

Thus, according to the present embodiment, the liner shell 1 can be manufactured with high molding accuracy and with high accuracy in shape and position of the cooling holes 3 in a short period of time. As a result, the number of manufacturing processes can be reduced by 30 to 50% or more. Since the rise in temperature of the liner shell 1 and the inner rings 2 during operation can be lowered, the life of the liner can be increased. Since the processing accuracy of the liner is improved, furthermore, the cooling performance of the liner, as well as the accuracy of thermal analysis for designing, is improved. If the cooling performance of the liner shell 1 is improved, the quantity of air introduced through the film cooling holes 3 will be reduced, whereupon the operating efficiency can be improved. Furthermore, from the ecological point of view, the NOx concentration can be lowered.

Figure 9:
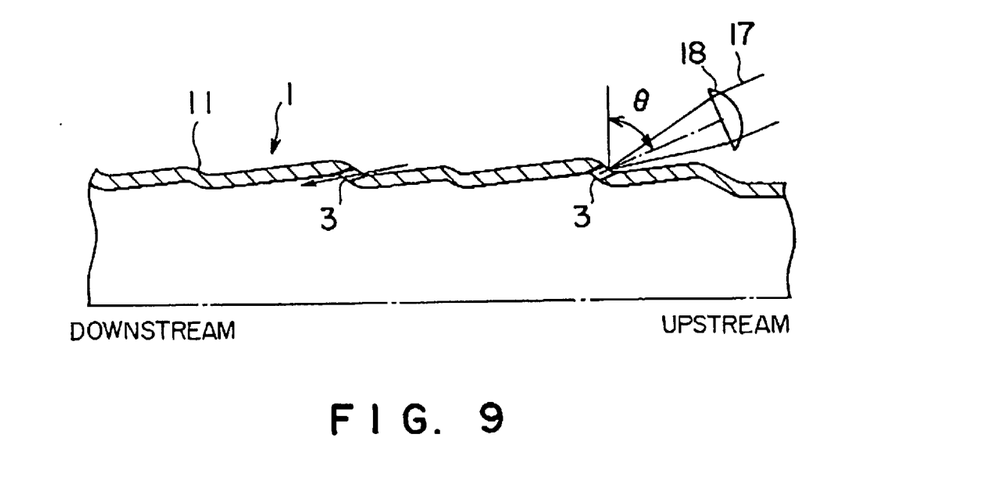
FIG. 9 is a sectional view for illustrating the way in which cooling holes are formed by laser drilling according to a second embodiment of the invention.

Referring now to FIG. 9, a combustor liner according to a second embodiment of the present invention will be described.

In the present embodiment, a liner shell 1 is not fitted with any inner rings, and cooling holes 3 are drilled through those regions of the liner shell 1 which are situated on the upstream side of wave crest portions of wavy configurations 11 and 11a, with respect to the flowing direction for the fuel gas, in a manner such that the respective central axes of the holes 3 are inclined toward upstream side at an angle 8 to a radial direction for the liner shell 1. Thus, air admitted through the cooling holes 3 is directed toward and along the inner surface of the liner shell 1, thereby maintaining a cooling film. Preferably, in this case, the inclination angle e should be set within the range from 45° to 80° for effective film cooling. As in the case of the first embodiment, the cooling holes 3 are formed by laser drilling. Among the manufacturing processes shown in FIG. 2, the processes of Steps S1 to S4 are naturally executed by using the hydrobulging method without any change, while the processes of Steps S5 and S6 are omitted.

Since the inner rings are not used according to the present embodiment, the manufacturing processes are considerably reduced in number. Moreover, air is directed immediately toward the liner shell 1 after it is admitted through the cooling holes 3 which are formed by laser drilling. Thus, the accuracy in position and shape of the cooling holes 3 can be greatly improved, whereby the cooling efficiency for the liner shell 1 can be increased.

Figure 10:
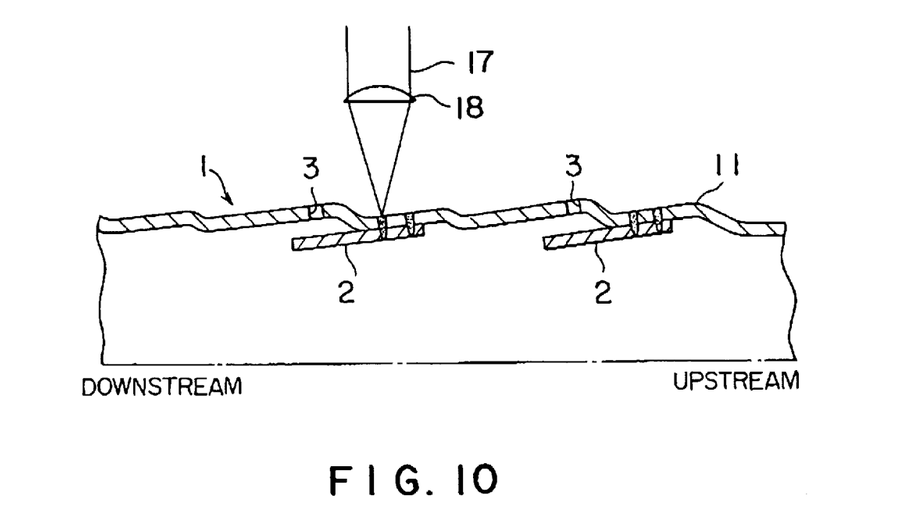
FIG. 10 is a sectional view for illustrating the way in which inner rings are bonded by laser beam welding according to a third embodiment of the invention.

Referring now to FIG. 10, a combustor liner according to a third embodiment of the present invention will be described.

In the present embodiment, inner rings 2 are welded to a liner shell 1 by laser welding in place of the resistance spot welding which is used in the first embodiment. As shown in FIG. 10, a laser beam 17 is applied from outside the liner shell, whereby the inner rings 2 are lap-welded. The welding operation may be carried out intermittently for one or two welded joints.

The following is a description of specific welding conditions for the inner rings 2 for this case.

$CO_2$ laser output: 500 to 5,000 W.

Perforating speed: 100 to 4,000 mm/min.

Processing gas: He, Ar, $N_2$.

Gas feed rate: 20 to 100 lit./min.

Focal length of lens: 127, 190, 254 mm.

Focal position: −8 to +3 mm.

Base material: Ni-based alloy, Co-based alloy.

In this case, the number of manufacturing processes is reduced to about ¼ to ¹⁄₁₀ of the number for the case of the resistance spot welding.

According to the present invention, as described above, there is provided a combustor liner which can be manufactured with improved accuracy in shape and position of cooling holes in a very short time, ensuring desirable buckling strength and satisfactory cooling performance. Also, the number of manufacturing processes can be reduced by 30 to 50% or more, and the rise in temperature of the liner shell and inner rings during the gas turbine operation can be lowered, whereupon the life of the liner can be increased. Since the processing accuracy of the liner is improved, the cooling performance of the liner, as well as the accuracy of thermal analysis for designing, is improved. If the cooling performance of the liner shell is improved, the quantity of air admitted through the film cooling holes is reduced, whereupon the load on a compressor is reduced, and the operating efficiency is improved.

More specifically, the center axis of each cooling hole is inclined toward downstream side with respect to a radial direction for the liner shell, whereby air is directed effectively toward and along the inner surface of the liner shell so as to maintain a satisfactory cooling film. Thus, the cooling efficiency for the liner shell can be improved.

When the inner rings are not used, the manufacturing processes are considerably reduced in number. Moreover, air is directed immediately toward the inner surface of the liner shell after it is admitted through the cooling holes, whereupon the cooling performance can be improved.

Since the wavy configuration and the corrugated configuration are formed by the hydro-bulging method, they can be completed with high accuracy in a short time. Furthermore, since the cooling holes are formed by laser drilling, moreover, the accuracy in position and shape of the cooling holes is greatly improved, whereby the cooling efficiency for the liner shell can be increased.

When the inner rings are not used, the manufacturing processes are considerably reduced in number. Since the wavy configuration and the like are formed by the hydro-bulging method, they can be completed with high accuracy in a short time. Since air is directed toward and along the inner surface of the liner shell after it is admitted through the cooling holes which are formed by laser drilling, the accuracy in position and shape of the cooling holes is greatly improved, whereby the cooling efficiency for the liner shell can be increased.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A multi-hole film-cooled combustor liner for a gas turbine, said combustor liner being mounted on a combustor located between a compressor and the turbine, said combustor liner comprising:

a wavy liner shell, mounted on said combustor, for exposure to heat in a combustion gas passing through said combustor, said liner shell having an inner surface, an outer side, and a plurality of laser drilled film cooling holes for admitting air from the outer side to the inner surface of said liner shell; and inner ring units, separately attached to the inner surface of said liner shell, for deflecting the air admitted through said cooling holes so as to direct air toward a downstream direction of the combustion gas along the inner surface of the liner shell, thereby maintaining a cooling film, said cooling holes each having a center axis inclined toward the downstream direction of the combustion gas.

2. The combustor liner according to claim 1, wherein the respective central axes of said cooling holes are inclined within an angular range from 20° to 60° in the downstream direction of the combustion gas with respect to a radial direction of the liner shell.

3. The combustor liner according to claim 1, wherein the respective central axes of said cooling holes are inclined toward the downstream direction of the combustion gas with respect to a radial direction of the liner shell in a manner such that air admitted through each cooling hole will be directed toward a junction between the liner shell and each corresponding inner ring unit.

* * * * *